United States Patent [19]
Chu et al.

[11] Patent Number: 5,818,360
[45] Date of Patent: Oct. 6, 1998

[54] CONFIGURATION FOR A COMPUTER INPUT DEVICE

[75] Inventors: Chou-Ming Chu, Taipei, Taiwan; Michele Fiore, Milan, Italy

[73] Assignee: Acer Incorporated, Taipei, Taiwan

[21] Appl. No.: 845,772

[22] Filed: Apr. 28, 1997

[51] Int. Cl.⁶ .......................... H03K 17/94; H03M 11/00
[52] U.S. Cl. .......................... 341/22; 341/20; 248/118.3; 361/680; 364/708.1; 400/472; 400/488; 400/715; 345/168; 345/169
[58] Field of Search .................... 341/22, 20; 364/708.1, 364/709.12, 189; 345/168, 169; 361/680, 683; 400/472, 488, 489, 682, 715; 248/118, 118.1, 118.3, 118.5

[56] References Cited

U.S. PATENT DOCUMENTS

| | | | |
|---|---|---|---|
| 5,145,270 | 9/1992 | Darden | 248/118.3 |
| 5,267,127 | 11/1993 | Pollitt | 361/680 |
| 5,457,453 | 10/1995 | Chiu et al. | 341/22 |
| 5,502,460 | 3/1996 | Bowen | 345/168 |
| 5,543,787 | 8/1996 | Karidis et al. | 341/20 |
| 5,567,067 | 10/1996 | Ambrose | 248/118.1 |
| 5,582,375 | 12/1996 | Martin | 248/118.3 |
| 5,588,759 | 12/1996 | Cloud | 400/472 |
| 5,596,481 | 1/1997 | Liu et al. | 248/118.3 |

OTHER PUBLICATIONS

U.S. application No. 08/521,531, Hsu et al, filed Aug. 29, 1995.

*Primary Examiner*—Michael Horabik
*Assistant Examiner*—Timothy Edwards, Jr.
*Attorney, Agent, or Firm*—Robert H. Chen

[57] ABSTRACT

This invention discloses an ergonomically designed keyboard which alleviates carpal tunnel syndrome. It comprises a keyboard and a tilting mechanism which tilts the keyboard so that the keys proximate to the user become elevated relative to the keys farther away from the user; that is, the keyboard slopes downwards away from the user. The tilting mechanism allows automatic keyboard tilting upon opening a notebook computer's screen lid, and also manual angular adjustment of the keyboard to fit the user's needs.

11 Claims, 9 Drawing Sheets

CONFIGURATION FOR A COMPUTER INPUT DEVICE

BACKGROUND OF THE INVENTION

1. Field of the Invention

This invention relates generally to key-in input devices, and more particularly to flexible input devices which can be changed to an inclining position.

2. Description of the Prior Art

Many conventional keyboards allow a keyboard to be tilted, with the keyboard surface sloping ascendantly away from the user. This configuration may be suitable for use when the keyboard is placed on a desktop. Because the keyboard is usually at an elevated position relative to the elbow, tilting the distal end of the keyboard, which is the end farther away from the user, allows the keyboard surface to become substantially parallel to the user's forearms, thereby placing less stress on the user's wrists.

A typical method for tilting a keyboard is to use supporting legs at the distal end of the keyboard. The supporting legs usually can be retracted to return the keyboard to a substantially horizontal position. In addition, some prior art keyboards have additional palm rest areas, which can relieve stress from the wrists. FIG. 1 is a drawing of a typical prior art computer input device with a keyboard and a palm rest.

However, when this keyboard is placed at a substantially level or lower position than the user's elbows, the upward tilted keyboard forces the user to place his/her hand in an unnatural orientation. Frequent use of such prior art keyboard placed in a position approximately level to or lower than the user's elbows can lead to stress injuries, such as carpal tunnel syndrome. This is especially true for business people who use laptop computers frequently during their travels.

SUMMARY OF THE INVENTION

What is needed, therefore, is a device for improving the ergonomics of keyboards. In particular, the device should be capable of inclining the keyboard surface downwards away from the user, resulting in a more natural hand and wrist orientation.

This is because the keyboard is then placed at a level or lower position than the elbow, with the forearms horizontal or slanting downward. This downward slanting orientation cannot be achieved by a prior art keyboard. At best, the supporting legs can be retracted, returning the keyboard to a horizontal position. The present invention therefore discloses an input device for a user to input data and control signals to a data processing apparatus. The input device mainly comprises a keyboard and a tilting mechanism which tilts the keyboard so that the keys proximate to the user become elevated relative to the keys farther away from the user; that is, the keyboard slopes downwards away from the user. The tilting mechanism allows automatic keyboard tilting upon opening a notebook computer's screen lid, and also manual angular adjustment of the keyboard to fit the user's needs.

One advantage of the present invention is that the keyboard can be easily moved from the tilted configuration into the conventional horizontal configuration during storage or transit. This is especially useful when used in a portable computer.

Another advantage is that a linkage assembly for tilting the keyboard can be internally disposed within the computer. The movements of the keyboard are entirely internal, i.e., they do not change the shape of the computer's outer housing. Therefore, the present invention will not diminish the stability of the main housing when the computer is placed on the user's lap.

A further advantage of the invention is that when used in a computer, the keyboard's tilting can be configured to be coupled with the movement of the computer screen lid.

The above is a brief description of some deficiencies in the prior art and advantages of the present invention. Other features, advantages and embodiments of the invention will be apparent to those skilled in the art from the following description, accompanying drawings and appended claims.

DESCRIPTION OF THE INVENTION

Figure 1:
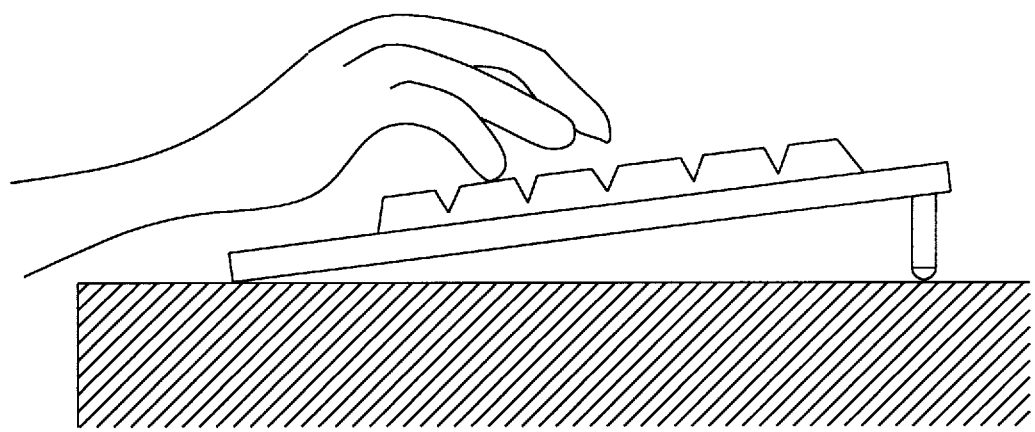
FIG. 1 is a drawing of the prior art keyboard.
Figure 2:
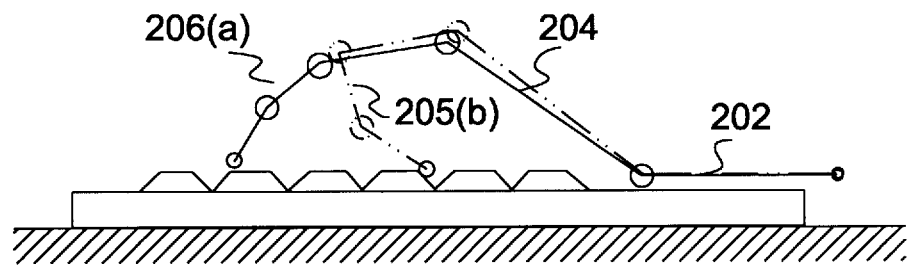
FIGS. 2 (*a*), (*b*) are skeleton diagrams of hand postures when using a computer keyboard device.
Figure 2:
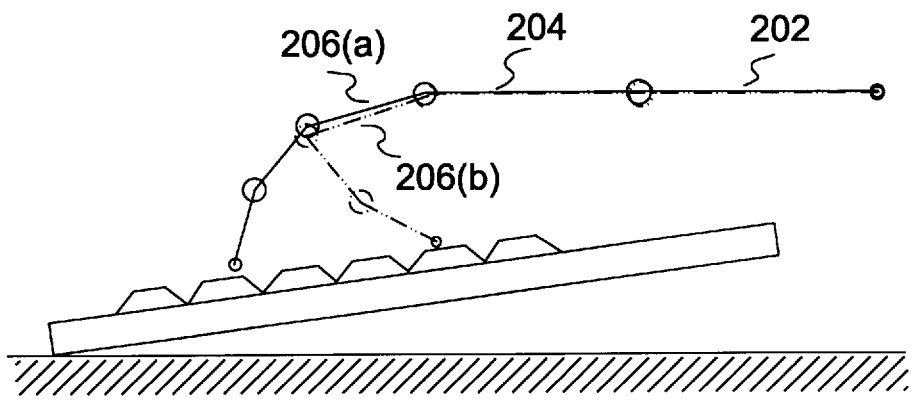

Prior art keyboards failed to recognize that when placed at a position relatively horizontal or lower than the user's elbows, a downward slanting keyboard is more suitable for use. Shown in FIG. 2 (*a*) is a skeleton diagram of a user's hand during keyboard use, with a forearm 202, a palm 204, a 1st finger position 206 (*a*), and a 2nd finger position 206 (*b*) (shown in dashed lines). When the keyboard surface is horizontal, the user tends to raise his/her hands to a perched position in order to reach the upper and lower keys with the same effort. Shown in FIG. 2 (*b*), when the keyboard surface is slanting downwards, the user tends to place his/her hands in a horizontal or lowered position relative to his/her forearms in order to reach the upper and lower keys with the same effort. A horizontally positioned hand places less stress on the wrist than a up-perched hand.

The present invention is directed to a device for tilting a computer input device to improve user hand and wrist orientation during use of the input device. To this end, the device provides an input device to slant downwards away from the user.

The device of the present invention comprises a keyboard and means for tilting the keyboard such that the keys closer to the user are at an elevated position relative to the keys farther away from the user. The tilting means comprises a supporting member for supporting the keyboard in a tilted position. The keyboard is disposed on a supporting surface, where the surface may be a desk or the user's lap, etc. The supporting member has first and second ends, in which the first end is pivotally coupled to the keyboard, and the second end is disposed at a position lower than the first end, and in contact with the supporting surface, thereby tilting the keyboard.

The housing body may also be used for holding a motherboard, with components such as microprocessors, memory devices, chipsets, etc. The lid may be used for holding a displaying device, such as an LCD display panel.

In the preferred embodiment, the present invention comprises a keyboard which slants downwards away from the user when the display screen of the computer is opened. The present invention automatically moves the keyboard into a substantially parallel orientation relative to the lower surface of the computer housing when the display is closed.

For description purposes, the proximal end is defined as the end which is closer to the user, and the distal end is defined as the end which is farther away from the user.

Figure 3:
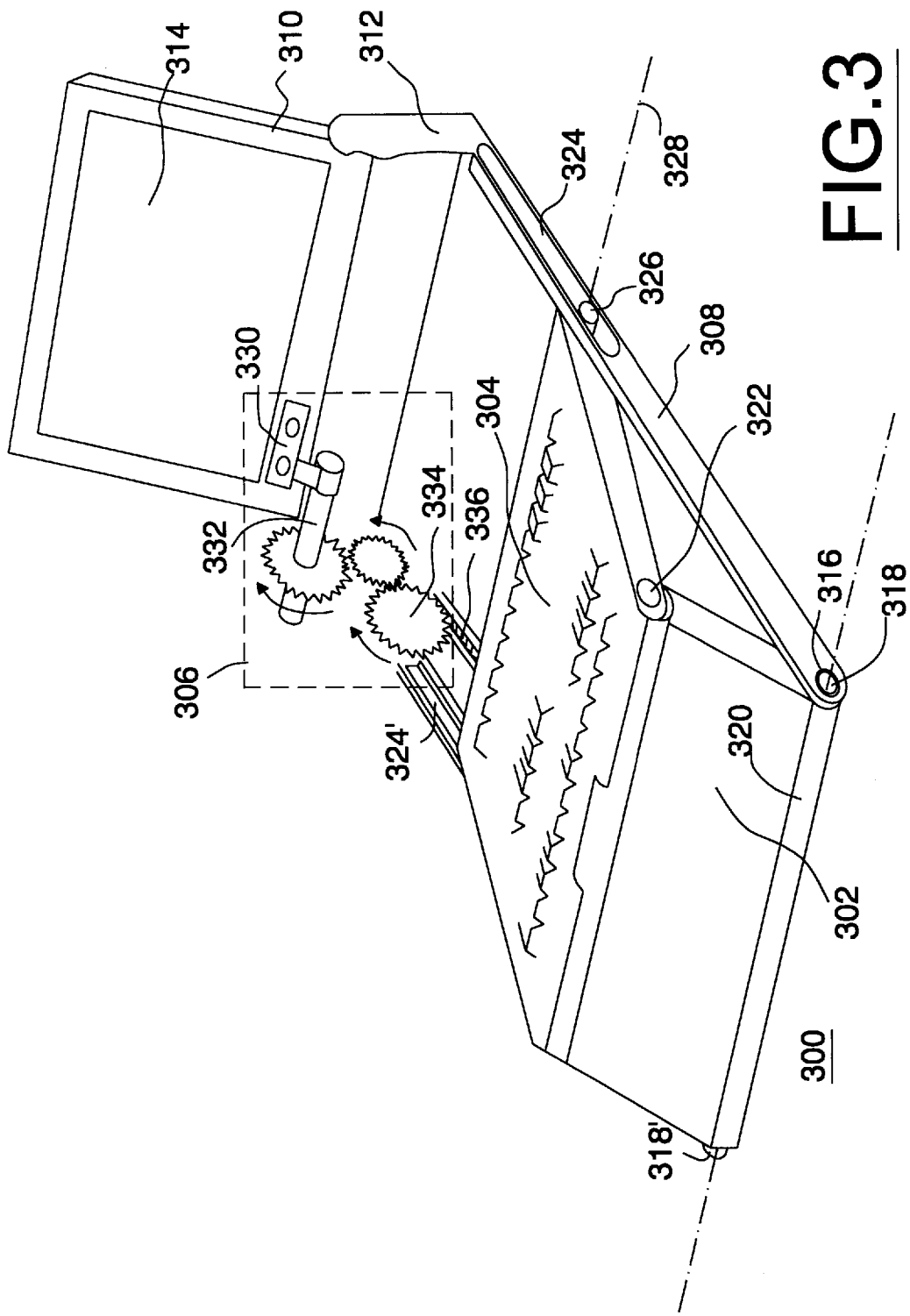
FIG. 3 is a perspective view of the preferred embodiment of the present invention.

Referring to representative FIG. 3, wherein like numerals indicate like elements, a portable computer 300 incorporates a palm rest 302, a keyboard 304, and a linkage assembly 306 for inclining keyboard 304 according to the principles of the present invention. Computer 300 generally includes a base housing 308 and a rectangular lid 310 conventionally secured to a rear wall 312 of housing 308 for pivoting lid 310 between its illustrated upright position and a lowered closed position (not shown).

The elements in the drawings are not precisely proportional to their actual implementation. For example, keyboard 304 and linkage assembly 306, etc., have been enlarged for the purpose of clearer illustration.

A keyboard typically comprises a key pad including alphanumeric characters, a controller and an I/O interface. The controller is used for translating the keystrokes on the keypad into certain codes (e.g., ASCII codes), and sending the codes to the microprocessor via the I/O interface.

Figure 4:
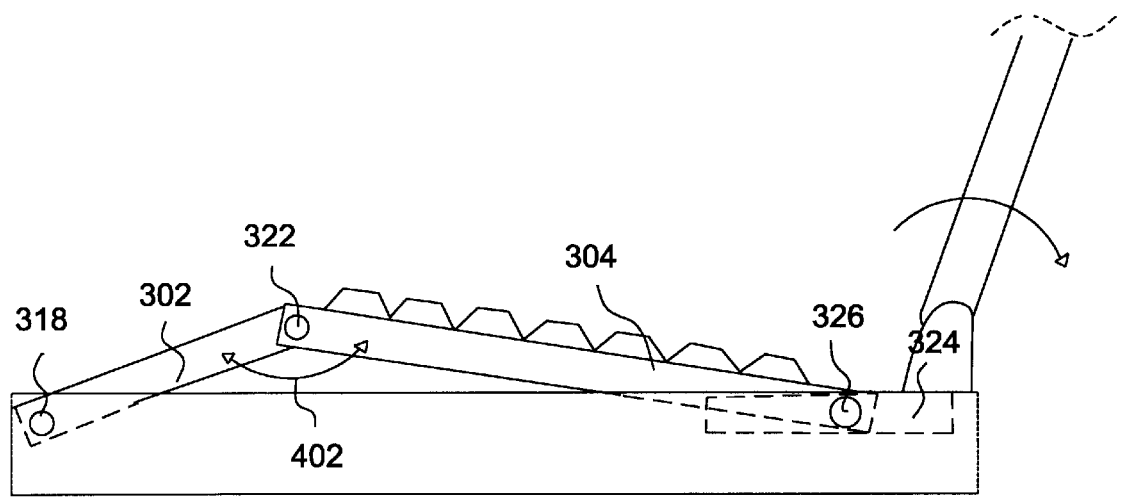
FIG. 4 is a side view of the preferred embodiment of the present invention.

FIGS. 3 and 4 illustrate the preferred embodiment of the present invention. Base housing 308 includes left and right sidewalls and a bottom wall adapted to rest upon a suitable surface, e.g., the user's lap. Housing 308 further defines a hollow for housing keyboard 304 between rear wall 312 and left and right sidewalls. Within the hollow also lies proximal palm rest 302 for supporting the user's hands during operation of keyboard 304. Housing 308 may also accommodate a central processing unit (not shown), and other computer components, such as a hard disk drive, etc., as known in the art.

Lid 310 may carry a display screen 314 extending across the front side of lid 310 and visible to the computer user when the lid is in its upright open position. Lid 310 further includes a latch (not shown) for latching the lid 310 in the lowered closed position. Lid 310 and base housing 308 are each formed in one integral piece from a molded plastic material, as is conventional in the art.

The right and left side walls of housing 308 include a pair of circular recesses 316 and 316' (not shown) to pivotally receive a pair of protuberances 318 and 318' located on both sides of palm rest 302. Protuberances 318 and 318' are located near the proximal end of palm rest 302. This allows palm rest 302 to pivot around an axis 320, where axis 320 runs through protuberances 318 and 318'. Palm rest 302 is pivotally coupled to keyboard 304 through a swivel mechanism 322, allowing the angle between palm rest 302 and keyboard 304 to be freely adjusted.

The left and right walls of housing 308 also include a pair of elongated recesses 324 and 324' to slidably receive a pair of nubs 326 and 326' (not shown) located on both sides of keyboard 304. Nubs 326 and 326' are located near the distal end of keyboard 304. Elongated recesses 324 and 324' run parallel to the bottom wall of housing 308. This allows the distal end of keyboard 304 to move in a plane parallel to the bottom side of housing 308. When nubs 326 and 326' move along elongated recesses 324 and 324', keyboard 304 also rotates around an axis 328 running through nubs 326 and 326'.

As the distal end of keyboard 304 moves toward the proximal end of palm rest 302, keyboard 304 and palm rest 302 form a ridge shape or lambda "Λ" shape configuration. Palm rest 302 is adjusted to tilt upwards, and keyboard 304 slants downwards away from the user.

FIG. 3 shows a linkage assembly 306, coupled to keyboard 304 and lid 310, for causing keyboard 304 to pivot between the open or operating position and the closed or carrying position. Linkage assembly 306 consists of a hinge 330, a swivel 332, a set of pinions 334, and a slidable rack rail 336. The hinge is connected to the swivel, the swivel is connected to one of the pinion gears, and another one of the pinion gears engages the rack rail. When lid 310 is turned to the open position, hinge 330 which is attached to lid 310 is pivoted around swivel 332, resulting in rotation of pinion gears 334. Pinion 334 push rack rail 336 away from lid 310, which in turn pushes keyboard 304 toward the user. For purposes of illustrative clarity, only one linkage assembly is shown, and the linkage assembly is magnified to clearly show its components. In implementation, two linkage assemblies are used to provide a balanced pushing force on the keyboard.

Figure 5A:
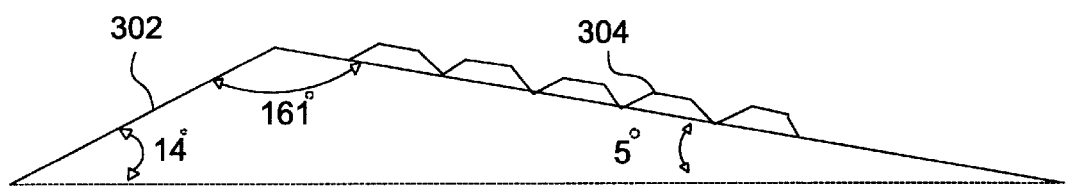
FIGS. 5 (*a*) and (*b*) are drawings of the relevant angles concerning the present invention.
Figure 5B:
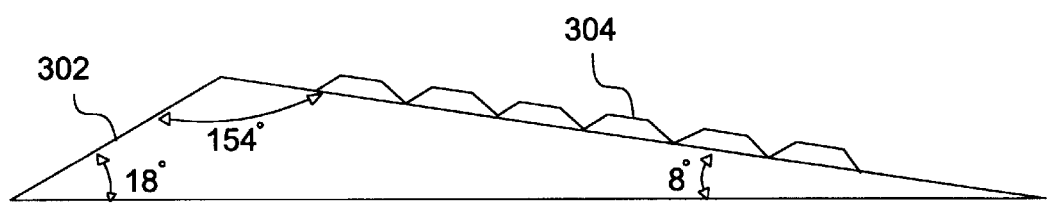

FIG. 4 is a side view of the preferred embodiment. The angle 402 between keyboard 304 and palm rest 302 can be adjusted by moving the distal end of the keyboard. Through experimentation, and shown in FIG. 5 (a) and (b), a typical user will feel most comfortable when angle 402 between keyboard 304 and palm rest 302 lies in the range of 154° and 161°. In addition, the optimal keyboard sloping angle with the lower surface of the housing is between 8° and 5°.

For the purpose of describing the orientation of the keyboard, typical keyboards includes a space bar key. Usually the space bar key is placed at a location closer to the user than the alphabetical character keys. Therefore, when the keyboard slopes downward away from the user, the space bar key is at an elevated position relative to most of the other keys. The portion of the keyboard surface containing the space bar key becomes at an elevated position relative to at least one of the other keys.

Figure 6:
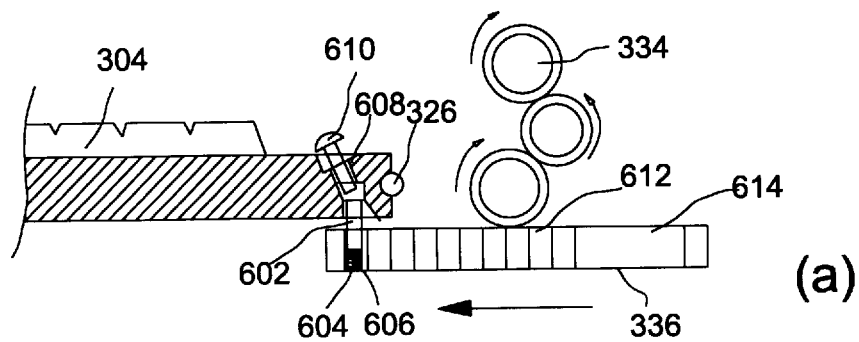
FIGS. 6 (*a*), (*b*), (*c*), and (*d*) are operational drawings of the linkage movements of the present invention.
Figure 6:
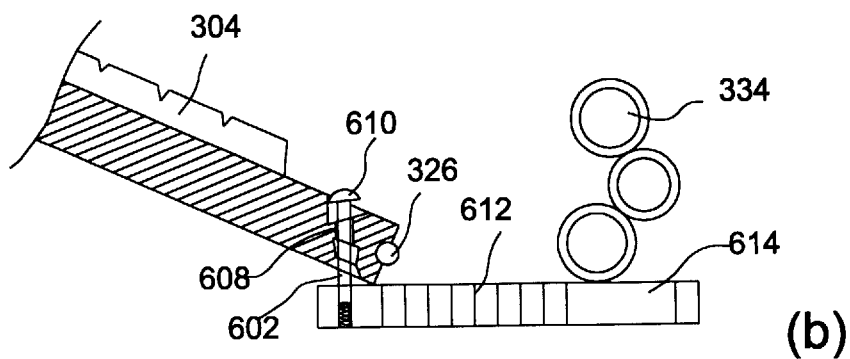
Figure 6:
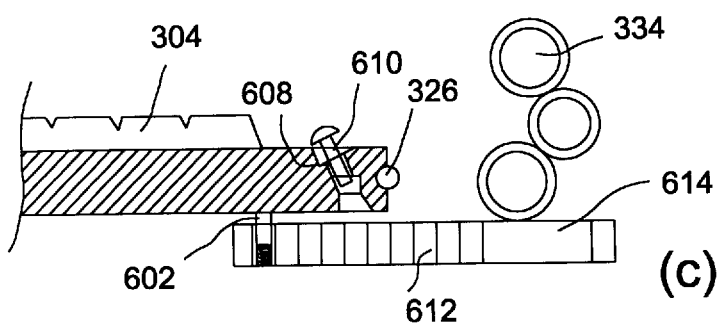
Figure 6:
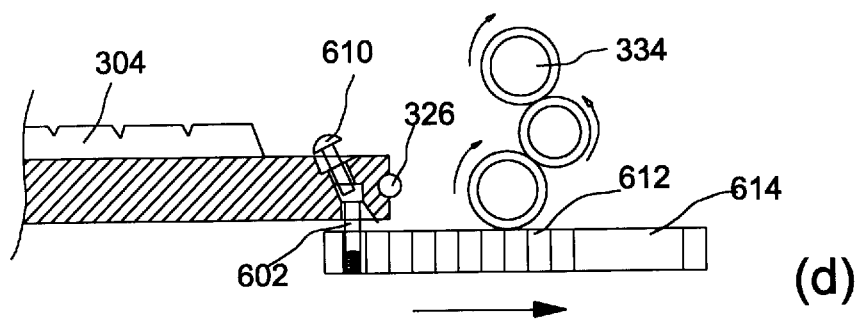

A detailed view of pinions 334, rack rail 336, and keyboard 304 are shown in FIG. 6. A small dowel 602, mounted on a spring 604, is inserted in a recess 606 on rack rail 336. A hole 608 is made near the distal end of keyboard 304 for receiving a small peg 610. The two ends of dowel 602 fit into recess 606 and hole 608, thereby coupling rack rail 336 to keyboard 304. FIG. 6 (a) shows the relative positions of the linkage assembly when lid 310 is closed.

FIG. 6 (c) shows that to disengage keyboard 304 from rack rail 336, peg 610 is pushed, which forces dowel 602 out of hole 608. Without dowel 602 to keep keyboard 304 in place, keyboard 304 (along with palm rest 302) returns to a horizontal position due to gravity.

Rack rail 336 includes a toothed area 612 and a smooth area 614. Only toothed area 612 will engage the teeth of pinions 334. FIG. 6 (*b*) shows the movements of linkage assembly 306 when lid 310 is opened. When lid 310 is opened from a closed position, pinions 334 are rotated, engaging toothed area 612 of rack rail 336, which then pushes the distal end of keyboard 304 towards the user.

FIG. 6 (*c*) shows that when pinions 334 reach smooth area 614 of rack rail 336, rack rail 336 will not move further even if lid 310 is opened further. This allows keyboard 304 and palm rest 302 to remain at a predetermined maximum tilting angle, while still allowing lid 310 to be further opened. When lid 310 is closed, the aforementioned motion is reversed: pinions 334 rotate reversely and push rack rail 336 towards lid 310, which in turn pulls keyboard 304 towards lid 310, returning keyboard 304 to a horizontal position.

Figure 7:
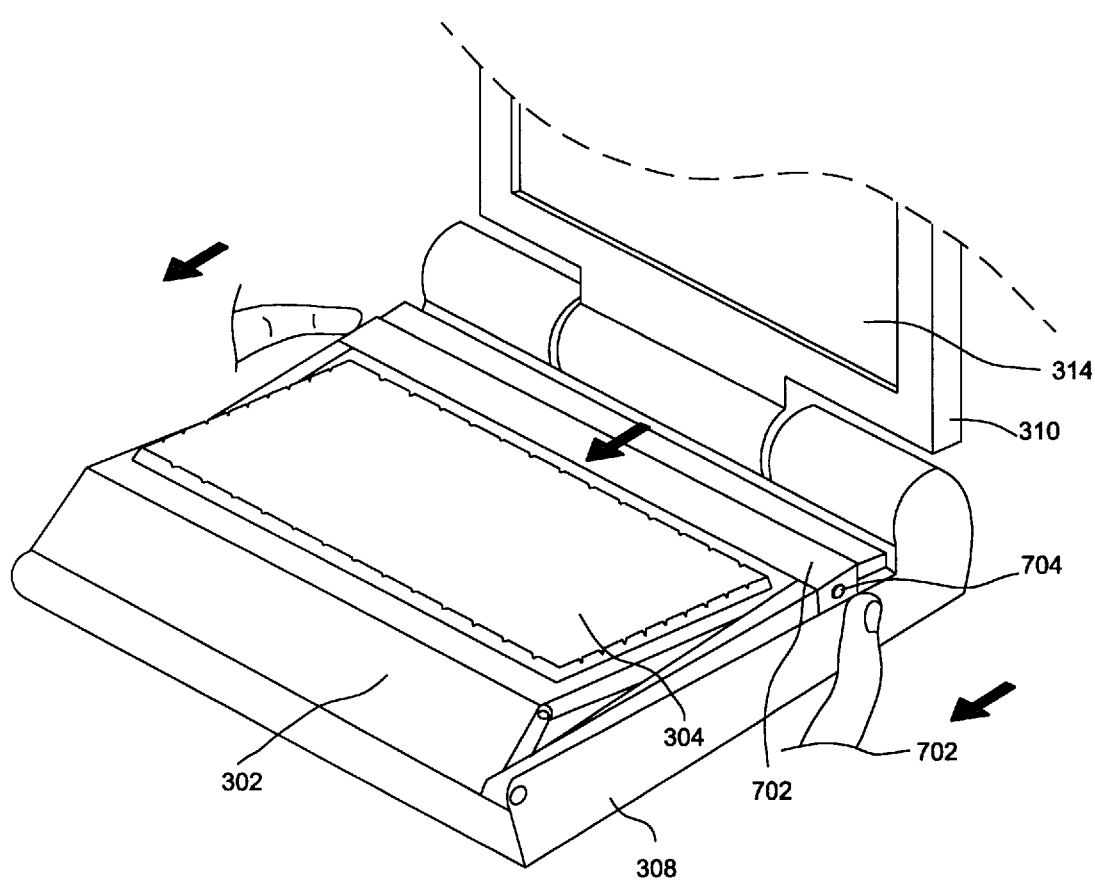
FIG. 7 is an operational drawing of an embodiment of the present invention.
Figure 8:
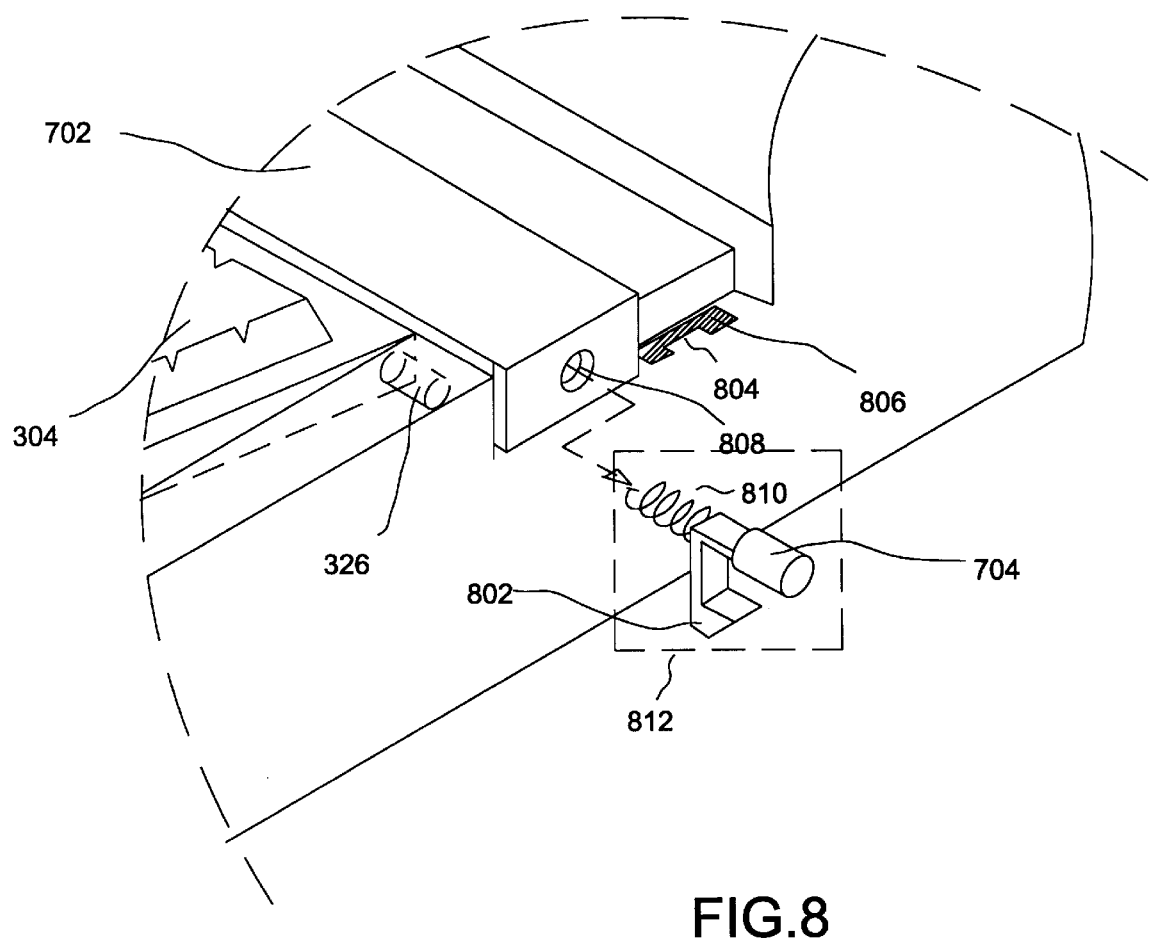
FIG. 8 is a partial dissection view of an embodiment of the present invention.

FIG. 7 is an operational drawing of another embodiment of the present invention. A push bar 702 is provided adjacent to the distal end of keyboard 304 to couple movements of keyboard 304 to that of lid 310 instead of using linkage assembly 306. The two ends of push bar 702 are provided with stopper mechanisms 812. FIG. 8 shows a stopper 802 provided at one end of push bar 702, wherein stopper 802 fits into a guiding duct 804. Guiding duct 804 has a number of indents 806 to receive stopper 802, which allows stopper 802 to be fixed at a number of positions along guiding duct 804.

One end of stopper 802 is shaped like a button 704. Button 704 fits into a hole 808 at one end of push bar 702. Stopper 802 is mounted on a spring 810, which provides the force to keep stopper 802 in one of indents 806. When button 704 is pressed against spring 810, stopper 802 is released from indents 806, thereby allowing adjustment of the position of push bar 702. Adjustment of the push bar in turn adjusts the tilting angle of keyboard 304 and palm rest 302.

Figure 9:
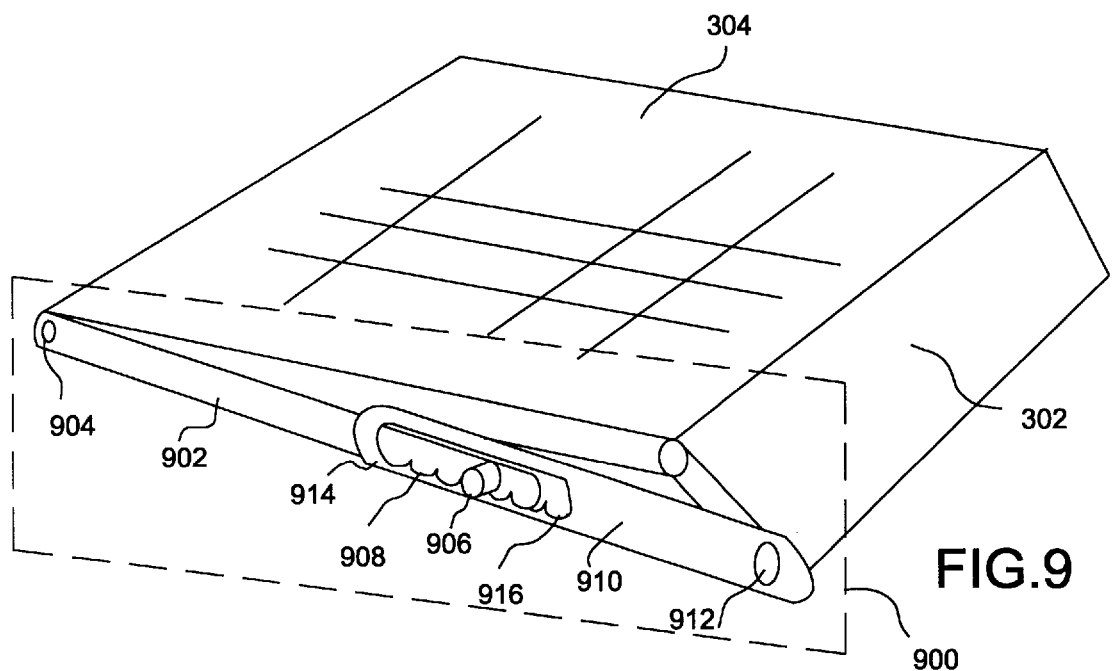
FIG. 9 is a drawing of an embodiment of the present invention.

FIG. 9 shows another embodiment. The proximal end of palm rest 302 and the distal end of keyboard 304 are linked via two pairs of overlapping arms 900 and 900' (not shown). A first arm 902 is coupled to keyboard 304, and a second arm 910 is coupled to palm rest 302. Only one pair of arms 900 is shown in FIG. 9, while in implementation two arms are provided on both the left and right sides of keyboard 304 and palm rest 302.

First arm 902 is pivotally coupled to the distal end of the keyboard via a first swivel 904. A nub 906 is provided at the other end of first arm 902 for coupling to a recess 908 with a number of indents 908 on second arm 910. One end of second arm 910 is pivotally coupled to the proximal end of hand support 302 via a second swivel 912.

When nub 906 resides in an indent 914 located farthest from second swivel 912, keyboard 304 and hand support 302 form a horizontal configuration. When nub 906 resides in an indent 916 nearest to second swivel 912, the distance between the distal end of keyboard 304 and the proximal end of palm rest 302 is shortened. Keyboard 304 and palm rest 302 form a ridge shape, or inverted 'V' configuration, with keyboard 304 slanting downwards away from the user.

Figure 10:
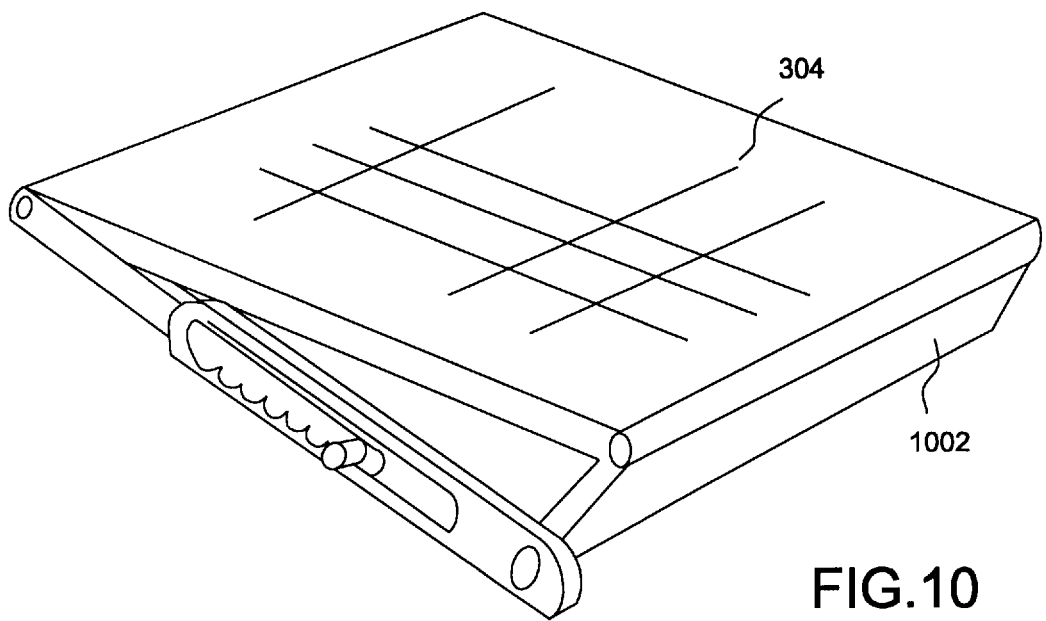
FIG. 10 is a drawing of an embodiment of the present invention.

In circumstances where a small keyboard footprint is desired, palm rest 302 may be designed to flip to the underside of keyboard 304 when placed in a carrying or storage position. FIG. 10 shows a support member 1002. Linkage assembly and means for securing the keyboard in the operating position may utilize the apparatae described in the above specific embodiments.

Figure 11A:
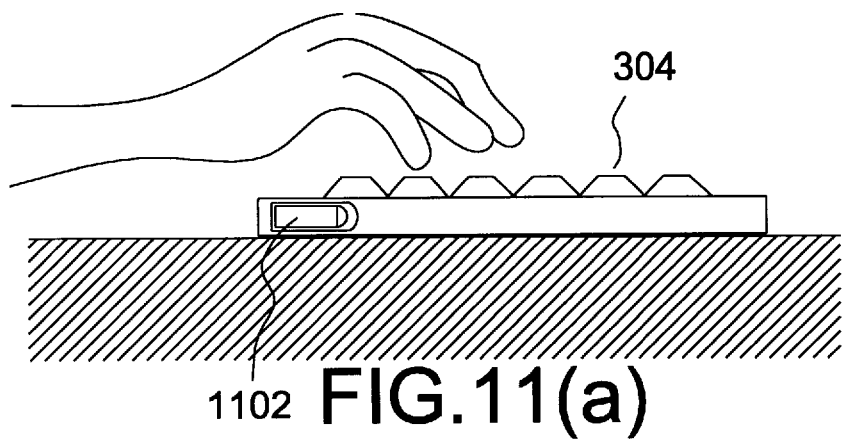
FIGS. 11 (*a*) and (*b*) are operational drawings of an embodiment of the present invention.
Figure 11B:
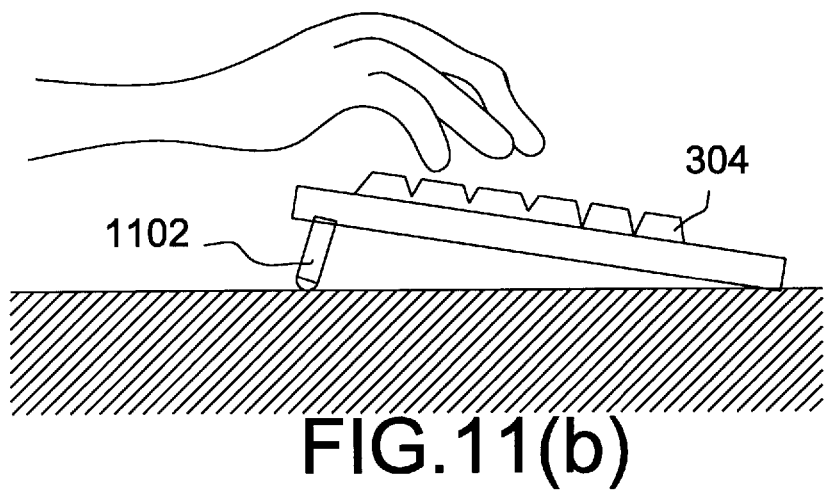

FIG. 11 is an operational drawing of another embodiment of the present invention. Standup pegs 1104 are pivotally coupled to the user end of keyboard 304. The standup pegs provide support for the user end of the keyboard, allowing the user end of the keyboard to be at an elevated position relative to the distal end of the keyboard. Typically, a stopper mechanism is provided so the standup pegs can be fixed at certain predefined positions. A recess 1104 is provided on the underside of keyboard 304 to receive the standup pegs when the keyboard is returned to a horizontal configuration.

Figure 12:
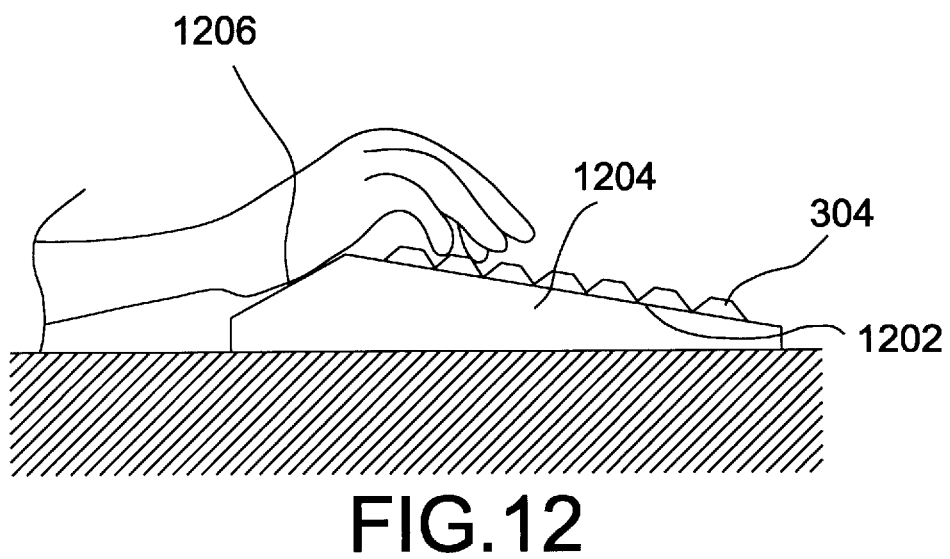
FIG. 12 is an operational drawing of an embodiment of the present invention.

FIG. 12 shows another embodiment. Keyboard 304 is mounted on a first side 1202 of a base 1204, where first side 1202 slants downwards away from the user. Base 1204 has a second side 1206 which is upwardly sloped, and performs the function of a hand support.

Figure 13:
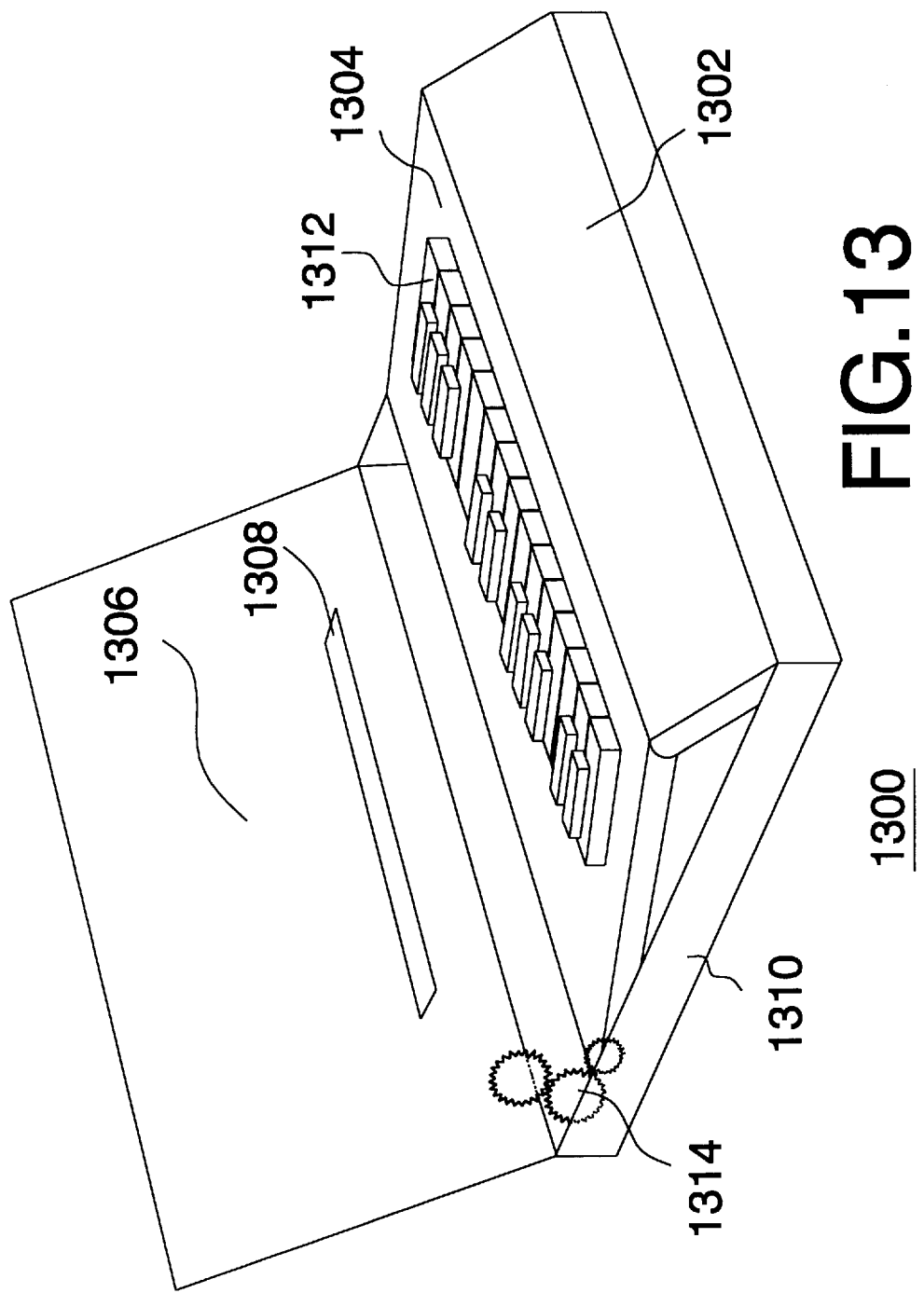
FIG. 13 is a drawing of an embodiment of the present invention.

FIG. 13 shows another embodiment for musical instruments. It is well known that students and professionals in the piano arts often encounter long term wrist and hand injuries from improper hand position while playing. The present invention provides a key-in device 1300 comprising a keyboard 1304, a support member 1302, a base 1310, a lid 1306, and a linkage assembly 1314. Lid 1306 is pivotally coupled to the distal end of base 1310. Keyboard 1304 comprises a plurality of keys 1312 for inputting musical notes. The proximal end of support member 1302 is pivotally coupled to the proximal end of base 1310, and the distal end of support member 1302 is pivotally coupled to the proximal end of keyboard 1304. A support stand 1308 is coupled to lid 1306 for holding a musical score. Linkage assembly 1314 is coupled to lid 1306 and keyboard 1304 for moving keyboard 1304 to a tilting position when lid 1306 is opened.

While the above is a full description of the specific embodiments, various modifications, alternative constructions and equivalents may be used. For example, the keyboard or the palm rest may further comprise a pointing device, such as a track ball, a touch pad, or a point stick. A built-in speaker or microphone may be incorporated in the keyboard or the palm rest. And while the above description is directed to a keyboard device, other kinds of input devices may be incorporated in the present invention, such as a game control pad. A large touch pad or a number of track balls may be used to replace the keyboard as the input device. The invention may also be used in musical instruments, such as the keyboard of a piano.

Other mechanisms for tilting the keyboard may also be utilized. For example, a mechanism for pushing the user end of the palm rest away from the user may be used instead of pushing the distal end of the keyboard towards the user. The palm rest does not necessarily have to couple to the keyboard through protruding ends at the sides of the keyboard. The palm rest may also be coupled to the underside of the keyboard. The palm rest may also be replaced by two supporting rods, pivotally coupled to the keyboard and the housing, to lift the user end of the keyboard. Alternatively, suspension cords may be used for linking the movement of the keyboard to the lid.

Therefore, the above description and illustrations should not be taken as limiting the scope of the present invention which is defined by the appended claims.

What is claimed is:

1. A data input device, comprising:
   a keyboard having a surface and a plurality of keys disposed thereon, said plurality of keys including a space bar key;
   a supporting member coupled to said keyboard for supporting said keyboard in a tilted position so that the portion of said surface containing said space bar key is at an elevated position relative to at least one of said plurality of keys, said supporting member having first and second ends, the first end pivotally coupled to said keyboard;

a pair of overlapping arms having a first arm pivotally coupled to the end of said keyboard farther away from said space bar key, a second arm pivotally coupled to the second end of said supporting member, and a locking means for locking said first arm and said second arm into one of a plurality of predetermined overlapping lengths;

wherein said keyboard, said supporting member, and said pair of overlapping arms form a triangular shape when said keyboard is tilted, and by configuring the length of overlap between said first arm and said second arm, said keyboard is tilted at one of a plurality of predetermined tilting angles.

2. A key-in apparatus for a portable computer, comprising:

a housing having a support surface, an edge and a lid pivotally attached thereto, said lid being movable between an open position and a closed position, said support surface having a distal end and a proximal end;

a keyboard being contained in said housing, and having a distal end and a proximal end;

linking means, coupled to said lid and to the distal end of said keyboard, for linking movement of said lid with said keyboard, pushing said keyboard in a direction away from said edge when said lid is moved to the open position;

a palm rest pivotally coupled to the proximal end of said keyboard and said support surface;

whereby said keyboard and said palm rest moves between a position wherein said keyboard and said palm rest is substantially parallel to said support surface when said lid is moved to the closed position, and a position wherein said keyboard is inclined downwards towards the distal end of said support surface and said palm rest is inclined downwards towards the proximal end of said support surface when said lid is moved to the open position.

3. The key-in apparatus of claim 2, wherein said lid comprises a display screen.

4. The key-in apparatus of claim 2, wherein said linking means comprises:

pinion means rotationally responsive to the pivotal movement of said lid between said closed position and said open position;

a rack rail coupled to said pinion and to said keyboard;

wherein rotation of said pinion means translates the pivotal movement of said lid to a translational movement of said rack rail, thereby causing said keyboard, in cooperation with said palm rest, to be inclined downwards towards the portion of said support surface proximate to said edge when said lid is moved to the open position.

5. The key-in apparatus of claim 4, further comprising coupling means for coupling said keyboard to said rack rail thereby linking the movement of said keyboard with said rack rail.

6. The key-in apparatus of claim 4, further comprising disabling means for decoupling said keyboard from said rack rail, thereby de-linking the movement of said keyboard from said rack rail.

7. The key-in apparatus of claim 6, wherein said coupling means comprises a dowel inserted between a hole disposed in said keyboard at the distal end of said keyboard and a hole disposed in said rack rail.

8. The key-in apparatus of claim 7, wherein said disabling means comprises:

a peg inserted in said hole disposed in said keyboard, said peg movable between a first position and a second position within said hole;

a spring disposed between one end of said dowel and said rack rail, whereby said dowel is movable between a first position wherein said dowel is coupled to said keyboard when said spring is substantially relaxed, and a second position wherein said dowel is decoupled from said keyboard when said spring is compressed;

wherein said dowel is. substantially within said hole in said keyboard when said peg is in said first position, and said dowel is forcibly moved by said peg against said spring when said peg is in said second position thereby being removed from said hole in said keyboard, thereby decoupling said keyboard from said rack rail.

9. An input device for a user to input data and control signals in a portable computing system, comprising:

a keyboard having a plurality of keys, comprising a proximal part being closer to the user, and a distal part being relatively farther from the user;

a base, having guiding means for slidably receiving the distal part of said keyboard, said guiding means having a plurality of indents for stopping said keyboard at a plurality of predetermined locations on said guiding means;

a palm rest, having first and second ends, the first end pivotally coupled to the proximal part of said keyboard, the second end pivotally coupled to said base;

whereby said distal part of said keyboard upon being moved along said guiding means in a direction towards the user, said palm rest and said keyboard arch upward from said base, wherein said palm rest slopes upwards and said keyboard slopes downwards from the user.

10. The input device of claim 9, wherein said tilting means further comprises a push bar adjacent to the distal end of said keyboard for forcibly moving the distal end of said keyboard towards the user, the ends of said push bar having stoppers disposed thereon, said stoppers being coupled to a pair of said plurality of indents for securing said keyboard at one of a plurality of predetermined positions so as to tilt said keyboard at one of a plurality of predetermined tilting angles.

11. A keyboard input apparatus for use in a portable musical instrument, comprising:

a housing having a support surface, an edge and a lid pivotally attached thereto, said lid being movable between a closed position where said lid is substantially parallel to said support surface, and an open position where said lid is at a substantial angle relative to said support surface;

a musical keyboard being contained in said housing, said musical keyboard having a distal end and a proximal end;

linking means, coupled to said lid and to the distal end of said musical keyboard, for linking movement of said lid with said musical keyboard;

a palm rest pivotally coupled to the proximal end of said musical keyboard and said support surface;

whereby said musical keyboard and said palm rest moves between a position wherein said musical keyboard and said palm rest is substantially parallel to said support surface when said lid is moved to the closed position, and a position wherein said keyboard is inclined downwards towards the distal end of said support surface and said palm rest is inclined downwards towards the proximal end of said support surface when said lid is moved to the open position.

* * * * *